United States Patent [19]
Gambaretto

[11] Patent Number: 6,028,136
[45] Date of Patent: Feb. 22, 2000

[54] POLYMERIC COMPOSITION CONTAINING FLUOROGRAPHITE SKI SOLE, AND METHOD OF MAKING SKI SOLE

[75] Inventor: Gian Paolo Gambaretto, Padua, Italy

[73] Assignee: Centeiro Trading, LDA, Funchal, Portugal

[21] Appl. No.: 08/898,117

[22] Filed: Jul. 22, 1997

[30]    Foreign Application Priority Data

Jul. 24, 1996 [CH]   Switzerland ............... 1848-96

[51] Int. Cl.[7] ................................................. C08K 3/00
[52] U.S. Cl. ........................................... 524/495; 524/496
[58] Field of Search ............................ 280/610; 524/495, 524/496

[56]          References Cited

U.S. PATENT DOCUMENTS

| | | | |
|---|---|---|---|
| 3,674,432 | 7/1972 | Margrave et al. ................. | 23/205 |
| 3,698,731 | 10/1972 | Jost et al. .......................... | 280/11.13 L |
| 3,902,732 | 9/1975 | Fosha, Jr. et al. ................ | 260/11.13 L |
| 4,118,532 | 10/1978 | Homsy .............................. | 428/494 |
| 4,272,577 | 6/1981 | Lyng .................................. | 428/112 |
| 4,321,295 | 3/1982 | Smith-Johannsen ............. | 428/206 |
| 4,679,814 | 7/1987 | Meatto et al. ..................... | 280/610 |
| 4,703,075 | 10/1987 | Egami ................................ | 524/267 |
| 4,933,127 | 6/1990 | Guiguet ............................. | 264/80 |
| 5,202,041 | 4/1993 | Traverso et al. ................. | 252/58 |

FOREIGN PATENT DOCUMENTS

| | | |
|---|---|---|
| 0 132 879 | 2/1985 | European Pat. Off. . |
| 39 35 525 | 2/1991 | Germany . |
| 403157494 | 7/1991 | Japan . |
| 403157497 | 7/1991 | Japan . |
| 1069089 | 5/1967 | United Kingdom . |

OTHER PUBLICATIONS

English–language abstract No. 103:126307u of Jpn Kokai Tokkyo Koho JP 60 67,593 (Apr. 17, 1985).
English–language abstract No. 103:126306t of Jpn Kokai Tokkyo Koho JP 60 67,594 (Apr. 17, 1985).
English–language abstract No. 112:142609k of Jpn Kokai Tokkyo Koho JP 01,266,192 (Oct. 24, 1989).
English–language abstract No. 102:28136x of Jpn Kokai Tokkyo Koho JP 59,149,996 (Aug. 28, 1984).
English–language abstract No. 6413q of German Patentschrift 1,594,392; Kometani, et al. (Apr. 26, 1973).
English–language abstract No. 117:9136r of Jpn Kokai Tokkyo Koho JP 03,252,453 (Nov. 11, 1991).
English–language abstract No. 96:218846j of U.S.S.R. SU 899,597; Blank, et al. (Jan. 23, 1982).
English–language abstract No. 99:177002x of U.S.S.R. SU 1,031,993; Oleshchuk, et al. (Jul. 30, 1983).
English–language abstract No. 107:135568q of Jpn. Kokai Tokkyo Koho JP 62 54,753 (Mar. 10, 1987).

*Primary Examiner*—Edward J. Cain
*Attorney, Agent, or Firm*—Hollander Law Firm, P.L.C.

[57]          ABSTRACT

A polymeric composition is provided comprising high molecular weight (HMW) or ultra-high molecular weight (UHMW) polyethylene containing fluorographite powder. The composition can be moldable into a ski sole or other article and provides a surface exhibiting an extremely low coefficient of friction. Skis and ski soles exhibiting extremely low coefficients of friction and extremely low surface tensions and made of the polyethylene/fluorographite compositions are also provided. In addition, methods of making compositions of HMW or UHMW polyethylene mixed with fluorographite, and ski soles made of such compositions are also provided.

22 Claims, 1 Drawing Sheet

POLYMERIC COMPOSITION CONTAINING FLUOROGRAPHITE SKI SOLE, AND METHOD OF MAKING SKI SOLE

FIELD OF THE INVENTION

The present invention relates to polymeric compositions having a low coefficient of friction. The present invention more specifically relates to skis and ski soles made from polymeric compositions having a low coefficient of friction. The present invention also relates to methods of making the compositions, skis and ski soles.

BACKGROUND OF THE INVENTION

Skis have long been made of materials which exhibit a low coefficient of friction to provide a fast and smooth gliding surface. Theoretically the sole of a ski should be as smooth as possible and should consist of a material not eroded by icy snow in such a manner that the surface becomes corrugated, causing increased friction forces. The material must also exhibit an extremely low surface tension.

Materials such as polypropylene, polymethacrylate and polytetrafluoroethylene would be expected to be suitable as gliding materials owing to their low surface tensions and correspondingly low coefficients of friction. However, these materials would suffer if used to make skis or ski soles in that they are not durable enough to not be marred by ice, snow and sometimes dirt, gravel or debris skis slide against during use. Thus, the use of these materials has not been of much interest in manufacturing skis and ski soles.

Polyethylene, on the other hand, is a material having useful characteristics in ski and ski sole applications, which stem from a high resistance to oxidation and good mechanical properties including elasticity modulus, high tensile strength, and high breaking load, all factors that increase with increasing molecular weight. However, polyethylene exhibits a surface tension of about 31 to about 33 dynes/cm, and thus the use of wax coating on the ski sole is recommended.

Polyethylene of high molecular weight (HMW) and of ultra-high molecular weight (UHMW) are used for skis and ski soles due to the good mechanical properties and sufficient hardness they exhibit. Despite some desired properties, even these higher molecular polyethylenes suffer from deep scratches and corrugations caused by friction on icy surfaces. Ski wax is used in order to eliminate the corrugations and irregularities on the sole surface, to lower the surface tension of the ski sole surface, and to provide a lubricant between the sole surface and the snow-covered ground.

In general, ski waxes are composed predominately of linear paraffins which, owing to their chemical structure, are partially soluble in the polyethylene. This solubility, however, decreases as the degree of polymerization is increased, and in polyethylenes of high and ultra-high molecular weight, the solubility of paraffins is reduced drastically such that the wax does not strongly cling to the ski sole but tends to be easily rubbed off. The impregnation capacity of the ski soles by the paraffin wax depends essentially on absorption exhibited due to the physical nature including porosity of the material. Polyethylenes of high molecular weight tend to have low impregnation capacities due to the high amount of polymerization which deleteriously affects porosity of the material.

To improve wax retention on HMW and UHMW polyethylene ski sole surfaces, particular ski waxes were developed such as "CERA F" wax, a perfluorinated paraffin, available from various suppliers including Miteni of Italy and Hoechst Aktiengessellschaft of Germany. Coatings of the CERA F wax exhibit surface tensions of about 16 to about 18 dynes/cm, as opposed to about 28 to about 30 dynes/cm for normal paraffin wax. However, CERA F is not sufficiently soluble in polyethylene to cling well.

Ski soles have also been made of HMW polyethylene and graphite. Graphite functions as a solid lubricant and is a hard material exhibiting a low surface tension and a low coefficient of friction. The static coefficient of friction ($\mu$) of polyethylene on polyethylene is 0.2 whereas $\mu$ for graphite on graphite is 0.12. The addition of graphite to the polyethylene: lowers the coefficient of friction of the ski sole from a value of $\mu$=0.2 for polyethylene to a value of $\mu$=0.12 for graphite; renders the ski sole and ski sole surface harder and more homogeneous in depth rendering the sole less susceptible to abrasion; helps maintain the same degree of gliding after the surface has been marred, scraped or corrugated during use; and produces a non-porous surface benefiting from the mechanical properties of the graphite which acts as a lubricant. Despite the advantages of mixing graphite with polyethylene to form ski soles, the mixture material nonetheless fails to meet an ever increasing demand for even faster and smoother ski sole surfaces.

Fluorographite is a solid lubricant obtained by direct fluorination of graphite with elemental fluorine. The coefficient of friction for fluorographite is 0.08, as compared to 0.12 for conventional carbon graphite. Fluorographite has been used in lubricant compositions containing fats, perfluorinated oils and TEFLON powder.

Fluorographite has also been incorporated in various polymer materials alone or associated with other lubricating or reinforcing materials. The polymer materials include is polyamidic resins as taught in Japanese Patent publication 91/252,453 (Nov. 11, 1991), ethylene-tetrafluoroethylene copolymers as taught in Russian Patent No. 899,597 (Jan. 23, 1982), epoxy-silicones as taught in Russian Patent No. 1,031,993 (Jul. 30, 1983), and fluoropolymers and polyacetals as taught in Japanese Patent publication 87/54,753 (Mar. 10, 1987). However, none of these references disclose incorporating fluorographite into high molecular weight polyethylene to form a composition which exhibits an extremely low coefficient of friction and which is strong enough to be used as a gliding surface of a ski sole.

The present invention provides polymeric compositions having extremely low coefficients of friction and surface tensions. The present invention also provides durable, long-lasting, scratch-resistant, wax-less ski soles which can withstand wear under skiing conditions and which are made from a polymeric composition having an extremely low coefficient of friction and surface tension which are far below the values achieved from incorporating conventional carbon graphite into polyethylene. The present invention also provides methods of making such compositions and for making skis and ski soles.

SUMMARY OF THE INVENTION

According to embodiments of the present invention, a polymeric composition is provided comprising high molecular weight (HMW) or ultra-high molecular weight (UHMW) polyethylene containing a fluorographite powder dispersed therein. The composition can be molded or formed into durable, long-lasting, scratch-resistant, wax-less ski soles which can withstand wear under skiing conditions and which are made from a polymeric composition having an extremely low coefficient of friction and surface tension which are far below the values achieved from ski soles incorporating conventional carbon graphite into polyethylene. The present compositions may also be used for gliding surfaces on the soles of water skis and on the underside of skateboards.

According to embodiments of the present invention, skis and ski soles exhibiting an extremely low coefficient of friction and an extremely low surface tension are provided comprising the polyethylene/fluorographite compositions of the present invention.

In addition, the present invention also relates to methods of making compositions of HMW or UHMW polyethylene mixed with fluorographite powder, and skis and ski soles comprising such compositions.

BRIEF DESCRIPTION OF THE DRAWING

The drawing figure is a graph showing the relationship between dynamic coefficient of friction ($\mu$) vs. the number of kilometers traversed on ski sole surfaces made of three compositions according to the present invention (Examples 4–6) and a comparative example (Comparative Example 2).

DETAILED DESCRIPTION OF THE INVENTION

Figure 1:
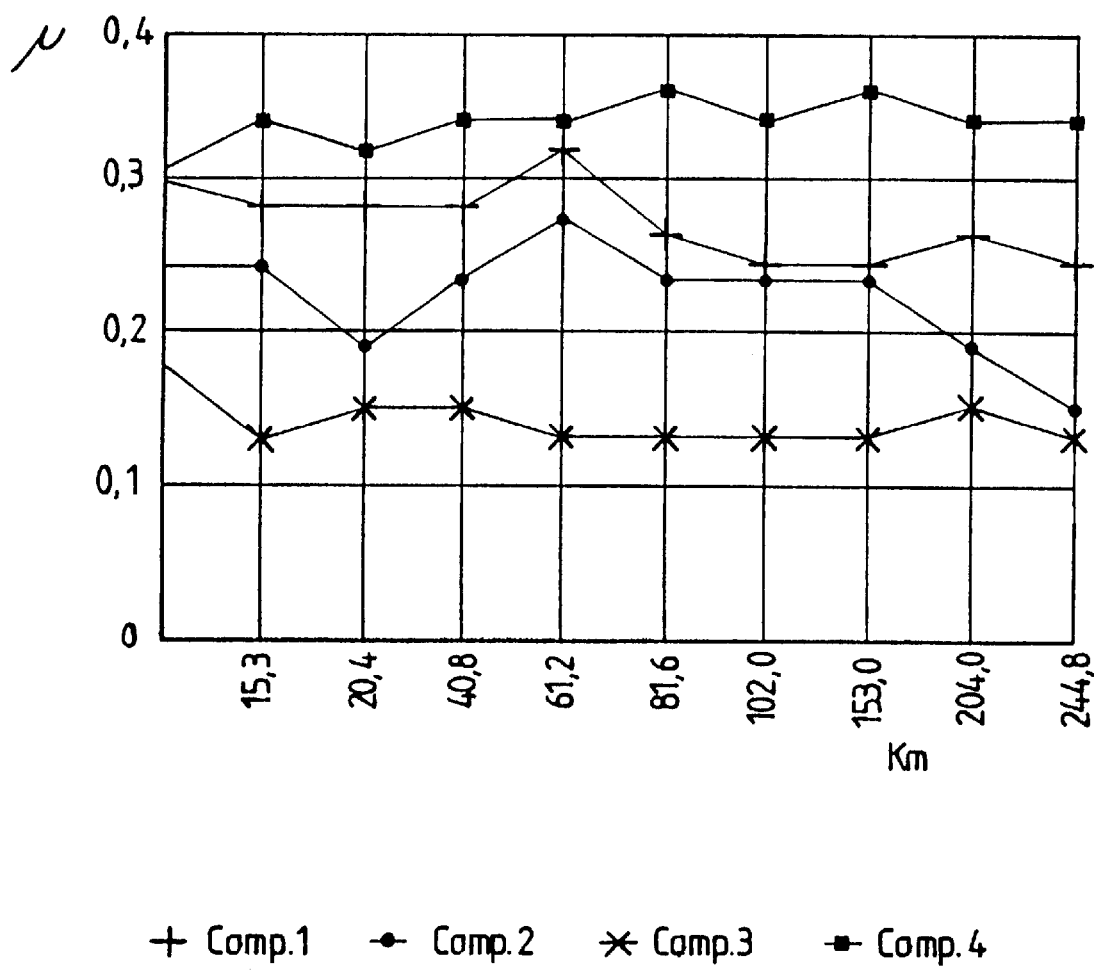

According to embodiments of the present invention, fluorographite is mixed into a high molecular weight (HMW) or ultra-high molecular weight (UHMW) polyethylene polymer to form a material having an extremely low surface tension and a low coefficient of friction on surfaces thereof. Preferably, the polyethylene has a molecular weight of about $1.5 \times 10^5$ gm/mol or greater. The polyethylene may comprise an UHMW polyethylene having a molecular weight of about $4.9 \times 10^5$ gm/mol or greater. According to some embodiments of the invention, the polyethylene is a HMW polyethylene and may have a molecular weight of about $5 \times 10^5$ gm/mol or greater, more preferably a molecular weight of about $1 \times 10^6$ gm/mol or greater.

According to some embodiments of the invention, the polyethylene is a HMW polyethylene having a molecular weight of from about $1.5 \times 10^5$ to about $4.9 \times 10^5$ gm/mol. According to some embodiments of the invention, the polyethylene is an UHMW polyethylene having a molecular weight of from about $4.9 \times 10^5$ to about $8 \times 10^6$ gm/mol. The molecular weight of the polymer may be determined by dividing the sum of the individual molecular weights divided by the number of the molecules, for example, generally the maximum point of the Gaussian curve describing the distribution of the molecular weight.

The polyethylene polymer may comprise a polymer of high density polyethylene (HDPE) having a specific gravity of greater than about 0.941. According to some embodiments of the invention, the polyethylene polymer may comprise a high density polyethylene homopolymer. According to embodiments of the invention, the polyethylene may have a density of from about 0.92 to about 0.95 gm/cm³. According to some embodiments of the invention, the polyethylene may have a density of about 0.93 gm/cm³.

According to embodiments of the invention, the present compositions comprise a mixture of polyethylene and fluorographite particles or powder. According to some embodiments of the invention, the mixture consists of, or consists essentially of HMW polyethylene and fluorographite particles or powder. According to some embodiments of the invention, the inventive composition preferably comprises about 95% by weight or more of a mixture of HMW polyethylene and fluorographite particles or powder, and more preferably the composition comprises about 99% by weight or more of a mixture of HMW polyethylene and fluorographite particles or powder.

According to embodiments of the present invention, the amount of HMW polyethylene in the mixture may be from about 50% by weight to about 97% by weight, and may preferably be from about 70% by weight to about 90% by weight. According to embodiments of the present invention, the amount of fluorographite in the mixture may be from about 3% by weight to about 50% by weight, and may preferably be from about 10% by weight to about 30% by weight.

Fluorographite is a solid lubricant obtained by the direct fluorination of graphite with elemental fluorine. Fluorographite is a fluorocarbon polymer in which fluorine atoms are interspersed between various layers of carbon atoms. Different coefficients of friction of the resulting fluorographite can be achieved depending on the type of graphite subject to the fluorination process. Different fluorinated graphites exhibit different coefficients of friction, as taught in Japanese Patent publication 85/67594.

The empirical formula for fluorographite is $C_mF_n$, wherein the molar ratio of fluorine to carbon, or n:m, is from about 0.5:1 to about 1.3:1, with ratios of from about 0.95:1 to about 1.3:1 being more preferred for some applications.

The color of the fluorographite particles or powder may be black, gray or white, depending upon the fluorine content. The fluorographite may have a specific density of from about 2.5 g/cm³ to about 2.8 g/cm³ and an apparent density of from about 0.5 g/cm³ to about 0.9 g/cm³, depending upon the type of graphite initially subject to the fluorination process. By itself, the fluorographite preferably exhibits a surface tension of from about 12 to about 13 dynes/cm.

According to embodiments of the present invention, the fluorographite particles or powders have an average particle size diameter of about 100 microns ($\mu$m) or less, for example, about 50 $\mu$m or less. Preferably, the fluorographite has an average particle size diameter of about 30 $\mu$m or less, and more preferably the fluorographite has an average particle size diameter of about 15 $\mu$m or less. According to some embodiments of the invention, the fluorographite has an average particle size diameter of about 10 $\mu$m or less. According to some embodiments of the invention, the fluorographite has an average particle size diameter of from about 1 micron to about 30 microns, with a predominant distribution from about 3 microns to about 15 microns.

The HMW polyethylene may be made by polymerizing ethylene at very high pressures, for example, 200 MPa, under controlled conditions. The resulting polyethylene generally has a melting point or range of from about 110° C. to about 115° C. The HMW polyethylene is thermoplastic and can be extruded or molded by injection or compression. Metallocene-catalyzed polyethylenes of high or ultra-high molecular weight may be used according to embodiments of the present invention.

According to embodiments of the present invention, HMW polyethylene may be provided in a powdered form, melted under a pressure of 1000 bars or more, and extruded from a ram extruder, for example, as taught in U.S. Pat. No. 4,933,127 to Guiguet, which is incorporated herein by reference.

According to embodiments of the invention, the mixture is blended in the proportions desired, exposed to pressure in cold state, then shaped into cylindrical form and sintered under controlled temperature and pressure conditions. For example, the shaped mixture may be heated to a temperature within the range of from the polyethylene melting point or range to a maximum temperature of about 220° C., and under a pressure of from about 50 to about 100 atmospheres. A tape having a thickness of, for example, 1.5 mm, may be obtained by cold peeling the resulting sintered cylindrical shape.

According to some embodiments of the invention, a surface of the cold peeled tape is treated by a conventional surface treatment technique, for example, corona discharge treatment. Adhesive is then used to glue the treated surface of the tape to a surface of an article. The article may be a ski sole according to embodiments of the invention, for example, the sole of a multi-layered ski core comprising layers of various materials such as wood, aluminum, steel, synthetic resin, and/or graphite fiber.

The present invention is further illustrated by the following non-limiting examples wherein all parts, percentages and ratios are by weight, and all temperatures are in ° C. unless otherwise indicated:

EXAMPLES 1–3 AND COMPARATIVE 1

Various exemplary compositions having different amounts were prepared and tested for coefficient of friction and to determine the affect of increasing percentages of fluorographite in mixtures with HMW polyethylene.

EXAMPLE 1

A mixture was prepared from 10% by weight fluorographite powder having an average particle size diameter of about 15 μm or less and a molar ratio of fluorine to carbon of about 1.3:1, and about 90% by weight high molecular weight polyethylene having an average molecular weight of about $7.3 \times 10^6$, a density of about 0.93 gm/cm$^3$, and elongation at break measurement of greater than 50%, a modulus of elasticity of 680 Newtons per mm$^2$, and a melting interval of from about 130° C. to about 135° C. An exemplary polyethylene having these properties is HOSTALEN GUR 4150, an UHMW polyethylene available from Hoechst Technical Polymers division of Hoechst Celanese Corporation, League City, Tex. The HOSTALEN GUR is an extremely tough, low temperature, low friction polymer exhibiting excellent abrasion and chemical resistance.

The mixture of fluorographite and polyethylene was blended until a substantially homogeneous mixture of fluorographite dispersed throughout the polyethylene, was obtained. The mixture was then shaped into cylindrical form, and heated under pressure in a closed oven to melt or sinter the polyethylene material. The shaped mixture was subjected to a maximum temperature of about 220° C. and pressures of from about 50 to about 100 atmospheres. The resulting material had a cylindrical shape 250 mm in diameter by 150 mm in length. The cylinders were then cold peeled into sheets having a thickness of about 1.5 mm.

The coefficient of friction for the sheet material was measured in a temperature controlled chamber according to method ASTM D 3702 using a steel C40 as the counter-surface material. The load selected was 6 pounds, corresponding to a specific pressure of 0.21 MPa or 21 kg/cm$^2$. The rotational speed of the testing device was 100 rpm corresponding to a linear speed of 1.41 m/s. As shown in Table I below, the average value of the dynamic coefficient of friction ($\mu$) measured on the material in sheet form was 0.27.

EXAMPLE 2

A mixture was prepared from 20% by weight fluorographite powder having an average particle size diameter of about 15 μm or less and a molar ratio of fluorine to carbon of about 1.3:1, and about 80% by weight HOSTALEN GUR 4150. The mixture was processed and tested in the same manner as described for the mixture in Example 1 above. The average value of the dynamic coefficient of friction ($\mu$) measured on the material in sheet form was 0.22.

EXAMPLE 3

A mixture was prepared from 30% by weight fluorographite powder having an average particle size diameter of about 15 μm or less and a molar ratio of fluorine to carbon of about 1.3:1, and about 70% by weight HOSTALEN GUR 4150. The mixture was processed and tested in the same manner as described for the mixture in Example 1 above. The average value of the dynamic coefficient of friction ($\mu$) measured on the material in sheet form was 0.13.

COMPARATIVE EXAMPLE 1

100% by weight HOSTALEN GUR 4150 containing no fluorographite was processed and tested in the same manner as described for the mixture in Example 1 above. The average value of the dynamic coefficient of friction ($\mu$) measured on the material in sheet form was 0.35.

TABLE 1

| EXAMPLE | DYNAMIC COEFFICIENT OF FRICTION ($\mu$) | % FLUOROGRAPHITE IN COMPOSITION |
|---|---|---|
| EXAMPLE 1 | 0.27 | 10 |
| EXAMPLE 2 | 0.22 | 20 |
| EXAMPLE 3 | 0.13 | 30 |
| COMPARATIVE 1 | 0.35 | 0 |

As can be seen from the foregoing, the addition of fluorographite in amounts of from about 10% by weight to about 30% by weight dramatically improves the dynamic coefficient of sheet materials comprising high molecular weight polyethylene, relative to the same polyethylene material without the fluorographite. Table 1 also shows that there is a sharp decrease in coefficient of friction when the level of fluorographite is increased from 20% by weight ($\mu$=0.22) to 30% by weight ($\mu$=0.13), particularly when compared to the decrease in coefficient when the level is increased from 10% by weight ($\mu$=0.27) to 20% by weight ($\mu$=0.22). For each composition containing the fluorographite (Examples 1–3), the blended material was capable of being sheeted.

EXAMPLES 4–6 AND COMPARATIVE EXAMPLE 2

Four substantially similar sets of skis were made and differed from each other in that the ski soles of each set comprised a respective one of the compositions of Examples 1–3 and Comparative Example 1 glued to the bottoms of the skis. The sets of skis having soles made from the compositions of Examples 1–3 respectively are labelled Examples 4–6, respectively. The set of skis made from the composition of Comparative Example 1 was labelled Comparative Example 2. Each set of skis (Examples 4–6 and Comparative Example 2) was then worn by a skier and subjected to skiing for a distance of about 244.8 kilometers (km). The dynamic coefficient of friction ($\mu$) of the ski sole surface was measured after various portions of the 244.8 km distance had been covered. The same instrumentation and method were used as those used to measure the coefficients reported in Table 1 above for Examples 1–3 and Comparative Example 1. The relationship between the measured dynamic coefficients of friction ($\mu$) and the various distances covered for each of Examples 4–6 and Comparative Example 2 are shown in the drawing figure.

As can be seen from the drawing figure, the average coefficient of friction improved over the distance travelled for each of the embodiments according to the present invention (Examples 4–6). The comparative material (Comparative Example 2), on the other hand, exhibited an increase in the average coefficient of friction over the distance tested. The constant or improving coefficient of friction achieved according to the invention can be attributed to the blended, substantially homogeneous dispersion of the fluorographite powder throughout the ski sole material.

Consistent properties of low surface tension and low coefficient of friction over distance are neither expected nor provided by wax-coated skis which do not contain fluorographite. The wax coating wears off of the gliding surface over distance travelled such that a continuous increase in coefficient of friction results.

According to the present invention, a wax coating is not needed to achieve and maintain a dynamic coefficient of friction ($\mu$) of less than 0.30, and more preferably, less than 0.20, over extended use of the ski.

What is claimed is:

1. A composition consisting essentially of from about 50% by weight to about 97% by weight polyethylene, and from about 3% by weight to about 50% by weight fluorographite particles.

2. A composition as claimed in claim 1 wherein said composition consists essentially of from about 70% by weight to about 90% by weight of said polyethylene and from about 10% by weight to about 30% by weight of said fluorographite particles.

3. A composition as claimed in claim 1 wherein said fluorographite particles have an average particle size diameter of about 100 microns or less.

4. A composition as claimed in claim 1 wherein said fluorographite particles have an average particle size diameter of about 15 microns or less.

5. A composition as claimed in claim 1 wherein said fluorographite particles have the general formula $C_mF_n$ wherein m is greater than 0, n is greater than 0, and the ratio of n to m is from about 0.5:1 to about 1.3:1.

6. A composition as claimed in claim 1 wherein said fluorographite particles have the general formula $C_mF_n$ wherein m is greater than 0, n is greater than 0, and the ratio of n to m is from about 0.95:1 to about 1.3:1.

7. An article comprising a surface layer made from the composition claimed in claim 1 wherein said fluorographite particles are substantially homogeneously dispersed throughout said polyethylene.

8. An article as claimed in claim 7 wherein said surface layer exhibits a dynamic coefficient of friction of about 0.20 or less.

9. An article as claimed in claim 7 wherein said article comprises the sole of a ski and said surface layer is the gliding surface of the ski sole which contacts snow or water during use.

10. A snow ski comprising a ski sole comprising the composition claimed in claim 1 wherein said ski sole has a surface which exhibits a dynamic coefficient of friction of about 0.20 or less.

11. A composition as claimed in claim 1 wherein said polyethylene has a weight average molecular weight of from about $1.5 \times 10^5$ to about $8 \times 10^6$ gm/mol.

12. A method of making an article having a surface of low coefficient of friction, said method comprising:

blending from about 50% by weight to about 97% by weight polyethylene and from about 3% by weight to about 50% by weight fluorographite particles, to form a mixture, shaping the mixture, heating the shaped mixture to a temperature sufficient to melt or sinter the polyethylene, solidifying the heated shaped mixture, and forming the solidified heated shaped mixture into an article having a surface, said surface exhibiting a dynamic coefficient of friction of about 0.30 or less, wherein said surface comprises a gliding surface of a ski.

13. A method as claimed in claim 12 wherein said heating comprises heating to a temperature of from about 200° C. to about 220° C. at a pressure of from about 50 atmospheres to about 100 atmospheres.

14. A method as claimed in claim 12 wherein said gliding surface exhibits a dynamic coefficient of friction of about 0.20 or less.

15. A method as claimed in claim 12 wherein said polyethylene has a weight average molecular weight of from about $1.5 \times 10^5$ to about $8 \times 10^6$ gm/mol and said article comprises a ski sole.

16. A method as claimed in claim 15 further comprising gluing the ski sole to a ski.

17. A method as claimed in claim 12 wherein said article is a snow ski.

18. A method as claimed in claim 12 wherein said mixture comprises from about 70% by weight to about 90% by weight ultra high molecular weight polyethylene and from about 10% by weight to about 30% by weight said fluorographite particles, and said fluorographite particles have an average particle size diameter of about 15 $\mu$m or less.

19. An article comprising a surface layer made from a composition comprising from about 50% by weight to about 97% by weight polyethylene, and from about 3% by weight to about 50% by weight fluorographite particles, wherein said article comprises the sole of a ski and said surface layer is the gliding surface of the ski sole which contacts snow or water during use.

20. An article as claimed in claim 19, wherein said fluorographite particles are substantially homogeneously dispersed throughout said polyethylene.

21. A snow ski comprising a ski sole, wherein said ski sole has a surface which exhibits a dynamic coefficient of friction of about 0.20 or less, and wherein said ski sole comprises a composition comprising from about 50% by weight to about 97% by weight polyethylene, and from about 3% by weight to about 50% by weight fluorographite particles.

22. A ski or board comprising a bottom gliding surface layer made from a composition comprising from about 50% by weight to about 97% by weight polyethylene, and from about 3% by weight to about 50% by weight fluorographite particles.

* * * * *